United States Patent
Baker et al.

(10) Patent No.: US 8,261,146 B2
(45) Date of Patent: Sep. 4, 2012

(54) METHOD AND APPARATUS FOR TRANSMITTING DATA, AND A COMMUNICATION SYSTEM

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1374 days.

(21) Appl. No.: 11/909,732

(22) PCT Filed: Mar. 27, 2006

(86) PCT No.: PCT/IB2006/050925
§ 371 (c)(1),
(2), (4) Date: Sep. 26, 2007

(87) PCT Pub. No.: WO2006/103618
PCT Pub. Date: Oct. 5, 2006

(65) Prior Publication Data
US 2010/0169731 A1 Jul. 1, 2010

(30) Foreign Application Priority Data
Mar. 31, 2005 (GB) .................................. 0506539.6

(51) Int. Cl.
*G08C 25/02* (2006.01)
*G08C 25/04* (2006.01)

(52) U.S. Cl. ......................................... 714/748; 714/800
(58) Field of Classification Search ........................ None
See application file for complete search history.

(56) References Cited

U.S. PATENT DOCUMENTS

| | | | |
|---|---|---|---|
| 6,317,418 B1 * | 11/2001 | Raitola et al. ................. | 370/278 |
| 6,771,631 B1 | 8/2004 | Lappeteläinen | |
| 2002/0199147 A1 | 12/2002 | Kim et al. | |
| 2004/0128609 A1 * | 7/2004 | Kurobe et al. ................. | 714/776 |

FOREIGN PATENT DOCUMENTS

| | | |
|---|---|---|
| GB | 2336071 A | 10/1999 |
| GB | 2370191 A | 6/2002 |
| GB | 2382010 A | 5/2003 |
| GB | 2391778 A | 2/2004 |
| WO | WO9914885 A2 | 3/1999 |
| WO | WO02067491 A1 | 8/2002 |
| WO | WO2004088853 A1 | 10/2004 |

* cited by examiner

*Primary Examiner* — John Trimmings
*Assistant Examiner* — Dipakkumar Gandhi

(57) ABSTRACT

A communication system employs discontinuous transmission to create gaps in transmission during which a transmitting device (200) can receive. When the transmission of a data block coincides with a transmission gap such that a portion of the data block is not transmitted, the block is retransmitted later. Prior to the retransmission, the data in the data block is reordered. The reordering may be predetermined, or may be selected to ensure that the same portion of data does not coincide with a transmission gap in the retransmission.

11 Claims, 2 Drawing Sheets

METHOD AND APPARATUS FOR TRANSMITTING DATA, AND A COMMUNICATION SYSTEM

The invention relates to a communication system employing first predetermined time periods for the transmission of data and second predetermined time periods for transmission gaps, to a method of transmitting data in such a system, and to an apparatus for transmitting data in such a system. The invention has particular application in mobile communication systems such as the Universal Mobile Telecommunication System (UMTS) but is not limited to such systems.

Communications systems, for example UMTS, employ retransmission protocols, commonly known as ARQ (Automatic Repeat Request) protocols in which transmitted data packets are acknowledged by the receiving equipment and retransmitted by the sending equipment if the acknowledgement, or lack of acknowledgement, indicates that the packet was not received successfully. In particular, UMTS employs Hybrid ARQ (HARQ) in which forward error correction is employed in addition to retransmission. Furthermore, in UMTS there may be several HARQ processes in progress in parallel.

UMTS comprises a compressed mode of transmission employing discontinuous transmission (DTX) in which gaps in transmission from a mobile terminal are created during which the mobile terminal can make measurements on received signals, for example in preparation for handover. When compressed mode is used in conjunction with HARQ, data that falls within a transmission gap is not transmitted in that gap, but may be transmitted subsequently by using the HARQ process to retransmit data packets that are interrupted by transmission gaps.

However, it is possible for one HARQ process to be continually interrupted by transmission gaps, for example if the HARQ process is synchronous and the period between transmission gaps happens to coincide with the period of the HARQ process. In this case the transmission gaps may prevent transmission of the same data bits in the initial transmission of a data packet and the retransmissions, thereby resulting in fruitless retransmissions and preventing the HARQ process from delivering all of the data. If the transmission of data and the transmission gaps are not precisely synchronised, eventually the whole of the data may be delivered after retransmissions, but such a method of operation is inefficient.

An object of the invention is to provide a retransmission scheme having improved efficiency.

According to a first aspect of the invention there is provided a method of transmitting data in a communication system employing first predetermined time periods for the transmission of data and second predetermined time periods for transmission gaps, the method comprising: dividing the data into data blocks; transmitting the respective data blocks during respective first predetermined time periods, subject to refraining from transmitting portions of the data blocks coinciding with the second predetermined time periods; retransmitting those data blocks transmitted during those first predetermined time periods which overlap any of the second predetermined time periods; and reordering the data in the retransmitted data blocks prior to the retransmission.

According to a second aspect of the invention there is provided an apparatus for transmitting data in a communication system employing first predetermined time periods for the transmission of data and second predetermined time periods for transmission gaps, the apparatus comprising: means for inhibiting transmission during the second predetermined time periods; means for dividing the data into data blocks; means for transmitting the respective data blocks during respective first predetermined time periods, subject to refraining from transmitting portions of the data blocks coinciding with the second predetermined time periods; means for retransmitting those data blocks transmitted during those first predetermined time periods which overlap any of the second predetermined time periods; and means for reordering the data in the retransmitted data blocks prior to the retransmission.

According to a third aspect of the invention there is provided a communication system employing first predetermined time periods for the transmission of data and second predetermined time periods for transmission gaps, the communication system comprising a first apparatus according to the second aspect of the invention, for transmitting data, and a second apparatus comprising means for receiving the transmitted and retransmitted data blocks, means for recovering the data from the received data blocks, and means adapted to reorder the recovered data to restore the initial order of the data.

By reordering the data in the retransmitted data blocks prior to retransmission, the likelihood that a portion of data that coincided with a transmission gap in the initial transmission of a data block also coincides with a transmission gap during retransmission of that block is reduced or eliminated.

The reordering may be predetermined. Such a reordering scheme has the advantage of being simple to implement, at both the device transmitting the data and at the device receiving the data and which restores the original order of the data.

The predetermined reordering may comprise, for example, pseudo-random reordering. Such a scheme has the advantage of being effective if the periods of data transmission and the transmission gaps are not synchronised, whilst also being simple to implement.

The reordering may be selected to ensure that a portion of a data block that coincides with a transmission gap does not also coincide with a transmission gap during retransmission of that data block. Such a scheme has the advantage of minimising the number of retransmissions.

The invention will now be described, by way of example, with reference to the accompanying drawings wherein.

Figure 1:
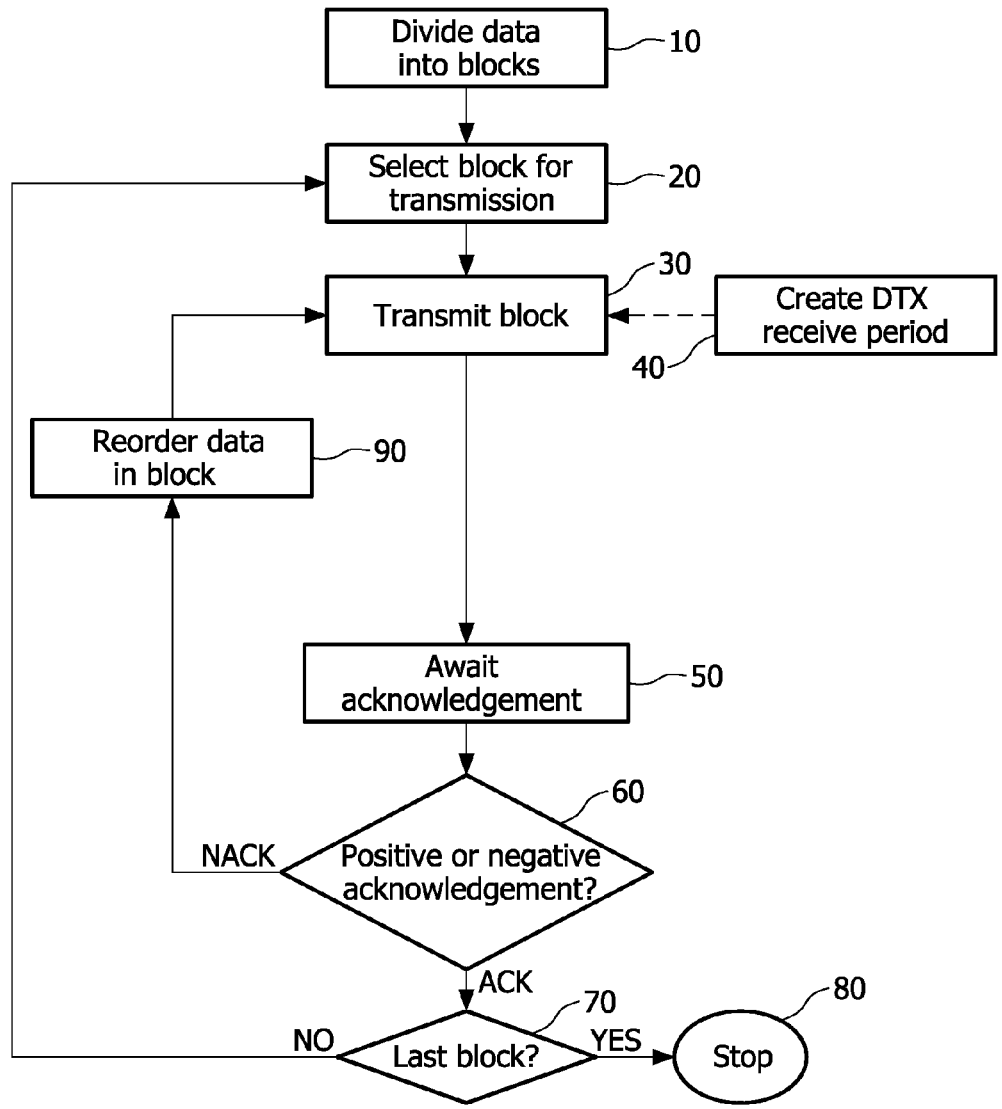
FIG. 1 is a flow chart of a method of transmitting data.
Figure 2:
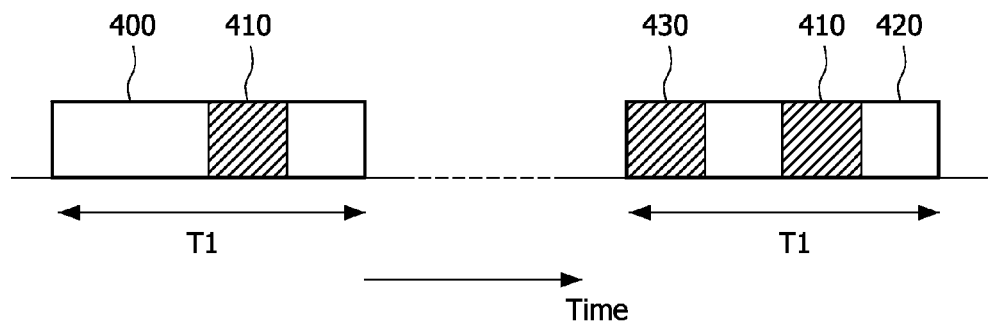
FIG. 2 is a timing diagram illustrating retransmission and reordering.

Referring to FIG. 1, at step 10 data for transmission is divided by a transmitting device into a plurality of data blocks. At step 20 the initial data block is selected for transmission and at step 30 the selected data block is transmitted in a predetermined transmission time period. In FIG. 2, a data block 400 is illustrated being transmitted in a predetermined transmission time to period have a duration T1.

At step 40 in FIG. 1 there is a concurrent process operating to create periods of reception, generating gaps in any ongoing transmission. These gaps are referred to below as DTX periods. Thus the transmission of a block may be interrupted by a DTX period. After the DTX period has terminated, transmission may resume if the predetermined transmission time period has not expired. In FIG. 2, a DTX period 410 occurs during the transmission of the data block 400 and transmission of the data block 400 resumes after the DTX period 410. In some circumstances the DTX period may coincide with the final portion of the data block, in which case transmission of the data block will be truncated and will not resume. In other circumstances the DTX period may coincide with the initial portion of the data block, in which case transmission of the data block would be truncated and commence late. In each case, the portion of the data block that coincides with the DTX period is not delayed and transmitted later within the same predetermined transmission time period, but instead is not transmitted during that same predetermined transmission time period. The transmission after the DTX period resumes, or commences late, with the portion of the data block that follows the DTX period.

At step 50 in FIG. 1 the transmitting device awaits an acknowledgement from a receiving device that receives the transmitted data block. At step 60 a test is performed to determined whether the received acknowledgement is positive or negative. If a positive acknowledgement (ACK) is received, indicating that the receiving device does not require retransmission of the data block, flow proceeds to step 70 where a test is performed to determine whether more data blocks remain to be transmitted. If no more data blocks remain to be transmitted, the process stops at step 80. Otherwise, if more data block remain to be transmitted, flow returns to step 20 where the next data block is selected for transmission.

If at step 60 it is determined that a negative acknowledgement (NACK) is received (or in some circumstances no acknowledgement is received), indicating that the receiving device does require retransmission of the data block, flow proceeds to step 90 where the data in the data block is reordered, to and then to step 30 where the reordered data block is transmitted.

Some non-exhaustive examples of reordering are as follows:
  a) the data in predetermined bit or symbol positions, or predetermined groups of bits or symbols, may be interchanged;
  b) predetermined rows or columns in a two dimensional matrix of the data bits may be interchanged;
  c) the data, or portions of the data, may be cyclically shifted;
  d) data from the DTX period may be shifted to predetermined symbols of the data block, for example to the beginning or the end;
  e) data from the DTX period may be shifted to a location that is known to avoid any DTX period in the retransmission period, for example to the earliest position which will avoid any DTX period, or to the latest position which will avoid any DTX period. The receiving device may be aware of when DTX periods will occur, or may be informed by means of signalling from the transmitting device. Alternatively, or additionally, the receiving device may be informed of what reordering has been applied, by means of signalling from the transmitting device.
  f) reordering may be applied only to data blocks whose transmission coincides with a DTX period, or may be applied to all data blocks that are retransmitted.

FIG. 2 illustrates data block 400 being retransmitted later as denoted by reference numeral 420, and a portion of data that would occur in the DTX period 410 has been shifted by the reordering such that it occurs at the beginning of the retransmitted data block 420, outside of the DTX period, as denoted by reference numeral 430.

The data in the data block may be encoded such that it includes parity check bits. When a data block is transmitted after reordering, the parity check bits may differ from those in the preceding transmission of the data block, for example because the parity check bits are calculated on different information bits, or because a different subset of parity check bits is transmitted.

Figure 3:
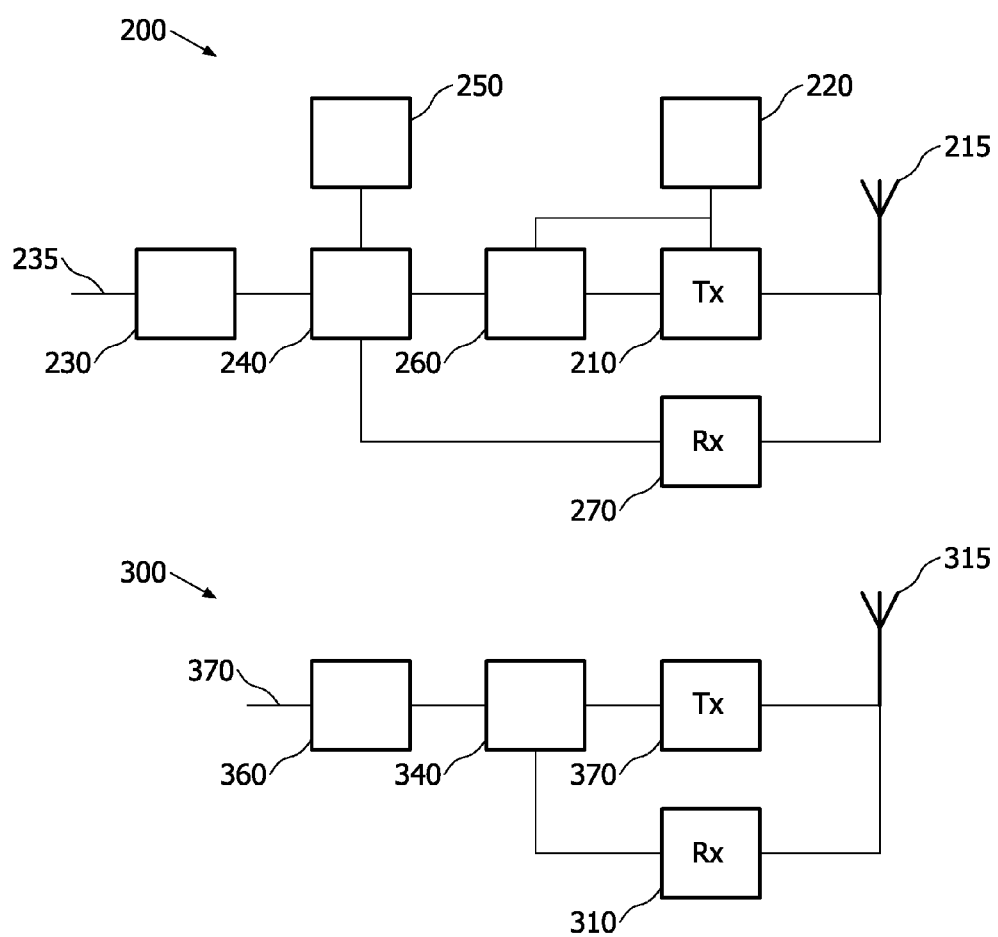
FIG. 3 is a block schematic diagram of a communication system.

Referring to FIG. 3, there is illustrated a first apparatus 200 for transmitting data and a second apparatus 300 for receiving the transmitted data. For the convenience of description, the first apparatus 200 is also referred to as a transmitting device, although that terminology is not intended to preclude the presence of a receiving capability. Similarly, the second apparatus 300 is also referred to as a receiving device, although that terminology is not intended to preclude the presence of a transmitting capability.

The transmitting device 200 comprises a transmitter 210 for transmitting the data via an antenna 215 and a DTX generator 220 for inhibiting transmission of data during DTX time periods. The transmitting device 200 includes a data partitioning means 230 for dividing data received on an input 235 into data blocks. The data partitioning means 230 is coupled to supply the data blocks to a data block processor 240 that selects the data blocks for transmission or for retransmission via the transmitter 210. The data block processor 240 may encode the data in the data blocks with parity check bits. There is a timeslot generator 250 coupled to the data block processor 240 for controlling the transmission of the data blocks to occur at the predetermined transmission time periods. A reordering means 260 is coupled between the data formatter 240 and the transmitter 210. The reordering means 260 is adapted to reorder the data in retransmitted data blocks prior to their retransmission. Examples of the reordering have been presented above. The transmitting device 200 further comprises a receiver 270 for receiving acknowledgements via the antenna 215 and delivering the acknowledgements to the data block processor 240. The data block processor 240 determines whether a received acknowledgement is a positive acknowledgement (ACK), in which case it selects a new data block, if any, for transmission, or a negative acknowledgement (NACK), in which case it selects the previously transmitted data block for retransmission.

The receiving device 300 comprises a receiver 370 for receiving transmitted data blocks via an antenna 315. The receiver 370 is coupled to deliver received data blocks to a data block processor 340 that determines whether the data in a received data block has been successfully received, in which case it initiates transmission of a positive acknowledgement (ACK) via a transmitter 310, or whether the data in a received data block has not been successfully received, in which case it initiates transmission of a negative acknowledgement (NACK) via the transmitter 310, in order to request retransmission of the data block.

Other acknowledgement strategies may be employed. For example, the receiving device may refrain from transmitting negative acknowledgements. This can have the same effect of causing retransmission of a data block, whilst conserving power and reducing interference.

A reordering means 360 is coupled to receive from the data block processor 340 data that has been successfully received. The reordering means 360 is adapted to reorder the received data such that the initial order of the data, prior to the reordering in the transmitted device 200, is restored.

Depending on the implementation details, the function of the reordering means 360 in the receiving device 300 may be amalgamated in the data block processor 340, for example in case reordering needs to be performed before the data block processor can determine whether the data has been successfully received.

The transmission gaps may be replaced by, or supplemented by, reception gaps in the data blocks at the receiving device 300, for example where the receiver 370 temporarily tunes to a different channel to make a measurement. In such a case the receiving device 300 comprises a discontinuous reception generator (not illustrated) coupled to the receiver 370 for inhibiting reception of the data during the second predetermined time periods. The transmitting device 200 may know in advance when such reception gaps may occur, or may be informed by the receiving device 300 when a reception gap has occurred.

In the present specification and claims the word "a" or "an" preceding an element does not exclude the presence of a plurality of such elements.

Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of communications and the art of retransmission protocols and which may be used instead of or in addition to features already described herein.

The invention claimed is:

1. A method of transmitting data in a communication system employing first predetermined time periods for the transmission of data and second predetermined time periods for transmission gaps, the method comprising acts of:
   dividing the data into first data blocks;
   transmitting the first data blocks during the respective first predetermined time periods, subject to refraining from transmitting portions of the first data blocks coinciding with the second predetermined time periods;
   reordering the data in the first data blocks into second data blocks to prevent the portions from coinciding with the second predetermined time periods for the transmission gaps during the transmitting; and
   transmitting the second data blocks.

2. The method as claimed in claim 1, wherein the reordering is performed in accordance with a predetermined scheme.

3. The method as claimed in claim 2, wherein the predetermined reordering scheme is selected from at least one of: pseudo-random reordering, a cyclic shift, subdividing the data block into two parts, and swapping the two parts.

4. The method as claimed in claim 1, wherein the reordering is selected to ensure that the portions do not coincide with any of the second predetermined time periods during the transmission of the second data blocks.

5. The method as claimed in claim 1, wherein the data in the first data blocks comprises parity check bits and the reordered second data blocks comprise parity check bits which differ from those in the first data blocks.

6. An apparatus for transmitting data in a communication system employing first predetermined time periods for the transmission of data and second predetermined time periods for transmission gaps, the apparatus comprising:
   a unit for inhibiting transmission during the second predetermined time periods;
   a unit for dividing the data into first data blocks;
   a unit for transmitting the first data blocks during the respective first predetermined time periods, subject to refraining from transmitting portions of the first data blocks coinciding with the second predetermined time periods;
   a unit for reordering the data in the first data blocks into second data blocks to prevent the portions from coinciding with the second predetermined time periods for the transmission gaps during the transmitting; and
   a unit for transmitting the second data blocks.

7. The apparatus as claimed in claim 6, wherein the unit for reordering is adapted to apply a predetermined reordering scheme.

8. The apparatus as claimed in claim 7, wherein the predetermined reordering scheme is selected from at least one of: pseudo-random reordering, a cyclic shift, subdividing the data block into two parts, and swapping the two parts.

9. The apparatus as claimed in claim 6, wherein the unit for reordering is adapted to select the reordering such that the portions do not coincide with any of the second predetermined time periods during the transmission of the second data blocks.

10. The apparatus as claimed in claim 6, further comprising a unit for encoding such that the data in the first data blocks comprises parity check bits, and the transmitted second data blocks comprise parity check bits which differ from those in the first data blocks.

11. A communication system comprising:
   first predetermined time periods for transmission of data and second predetermined time periods for transmission gaps;
   at least one apparatus for transmitting data, the apparatus comprising:
   a unit for inhibiting transmission during the second predetermined time periods,
   a unit for dividing the data into first data blocks,
   a unit for transmitting the first data blocks during the respective first predetermined time periods, subject to refraining from transmitting portions of the first data blocks coinciding with the second predetermined time periods,
   a unit for reordering the data in the first data blocks into second data blocks to prevent the portions from coinciding with the second predetermined time periods for the transmission gaps during the transmitting, and
   a unit for transmitting the second data blocks.

* * * * *